United States Patent [19]
Sasaki

[11] 3,731,265
[45] May 1, 1973

[54] HOLOGRAPHIC IMAGING SYSTEM BY ULTRA-SOUND

[75] Inventor: Soji Sasaki, Hitachi, Japan
[73] Assignee: Hitachi, Ltd., Tokyo, Japan
[22] Filed: Dec. 1, 1971
[21] Appl. No.: 203,725

[30] Foreign Application Priority Data

Dec. 16, 1970 Japan..............................45/111797

[52] U.S. Cl. ..............340/5 H, 340/5 MP, 73/67.5 H
[51] Int. Cl.............................................H04b 11/00
[58] Field of Search..........................340/5 H, 5 MP; 73/67.5 H

[56] References Cited

UNITED STATES PATENTS 3,475,551  10/1969  Green et al. .......................340/5 MP
3,097,522   7/1963  Weller..............................340/5 MP

OTHER PUBLICATIONS

Holbrooke et al., "Diagnostic Holography–A Feasibility Study" 3/7/69, pg. 251–263, Acoustical Holography, by Metherell et al., Vol. 2.

*Primary Examiner*—Benjamin A. Borchelt
*Assistant Examiner*—N. Moskowitz
*Attorney*—Craig and Antonelli

[57] ABSTRACT

In ultrasonic holography in which a hologram is obtained by a process including the steps of projecting an ultrasonic beam on to an object to be analyzed, mixing the beam transmitted through or reflected from the object with a reference ultrasonic wave to produce an interference pattern or a hologram on a plane, and recording the interference pattern by a photographic or other recording means; a system for reproducing a holographic image from the thus obtained hologram using an ultrasonic wave instead of a coherent light, use of the latter on a miniaturized hologram having been common in the conventional system; and modified systems of the same.

9 Claims, 8 Drawing Figures

Patented May 1, 1973

INVENTOR

SOJI SASAKI

BY Craig, Antonelli & Hill
ATTORNEYS

INVENTOR
SOJI SASAKI

Patented May 1, 1973

INVENTOR

SOJI SASAKI

BY Craig, Antonelli & Hill
ATTORNEYS

HOLOGRAPHIC IMAGING SYSTEM BY ULTRASOUND

This invention relates to ultrasonic holography, particularly to the image reproduction in ultrasonic holography.

Ultrasonic holography is used for analyzing structural features of substances which do not transmit light or other radiant rays. It is a very promising method which can be used for various purposes such as the non-destructive inspection of metals, the medical diagnosis and the survey of submerged surfaces or substances.

In conventional ultrasonic holography, an object or specimen is exposed to an ultrasonic beam which is a coherent wave, and the wave transmitted through or reflected from the specimen is mixed with a reference wave to produce an interference pattern on a plane within an ultrasonic wave transmitting medium. The interference pattern is then photographed to make a record thereof, that is, a hologram. Reproduction of a holographic image from the hologram recorded on a film is achieved by projecting a laser light, that is, a coherent light on to the hologram and collecting the diffracted light. However, there are great difficulties in connection with the above-described conventional reproduction method because of the wide difference in the wavelength between the ultrasonic wave which is used for the recording and the laser light which is used for the reproduction.

Namely, the frequency of the ultrasonic wave used for the recording is usually in the range of 100 kHz to 10 MHz which corresponds to the wavelength of 15 mm to 0.15 mm in water, whereas the wavelength of the laser light used for the reproduction of a holographic image is shorter than one micron. For example, the wavelength of He-Ne laser light is 6328 angstroms. Therefore, in order to effect reproduction using the laser light from a hologram recorded with such an ultrasonic wave, the hologram must be reduced to a size 0.00004 to 0.004 times as small as the original size, which corresponds to the ratio of the wavelength of the laser light to that of the ultrasonic wave. For example, if reproduction is to be performed using the He-Ne laser light from a hologram of 1 m square which is made in water using a 2 MHz ultrasonic wave, the size of the hologram must be reduced to 0.8 mm square. Therefore, with conventional measures, it is impossible to obtain a clearly reproduced image, because of the deterioration of resolution due to the reduction of size and also of the difficulty involved in observing the reduced image. In connection with the latter difficulty, a further drawback of troublesome operation arises from the compulsory use of a microscope or the like for the observation of the reproduced image.

The object of this invention is to remove the above-mentioned drawback of the conventional system and to provide a system for reproducing ultrasonic holographic images which ensures a clear image as well as easy observation and allows quick reproduction after a recording.

In order to achieve the above object, the reproduction system of this invention comprises a planar transducer for emitting an ultrasonic wave in response to an electric excitation, said transducer being able to be electrically strained spot-by-spot over the plane thereof so as to store a pattern of electrical strains and the intensity of the ultrasonic wave emitted from a given spot in the plane of said transducer being a representation of said electrical excitation modulated by the magnitude of the strain at the spot, means for exciting said transducer to emit an ultrasonic wave into an ultrasonic wave conducting medium to produce a pattern of acoustic stress in said medium, and means for visualizing said acoustic stress.

This invention will be described in detail in connection with embodiments of the invention and with reference to the accompanying drawing, in which.

Figure 1:
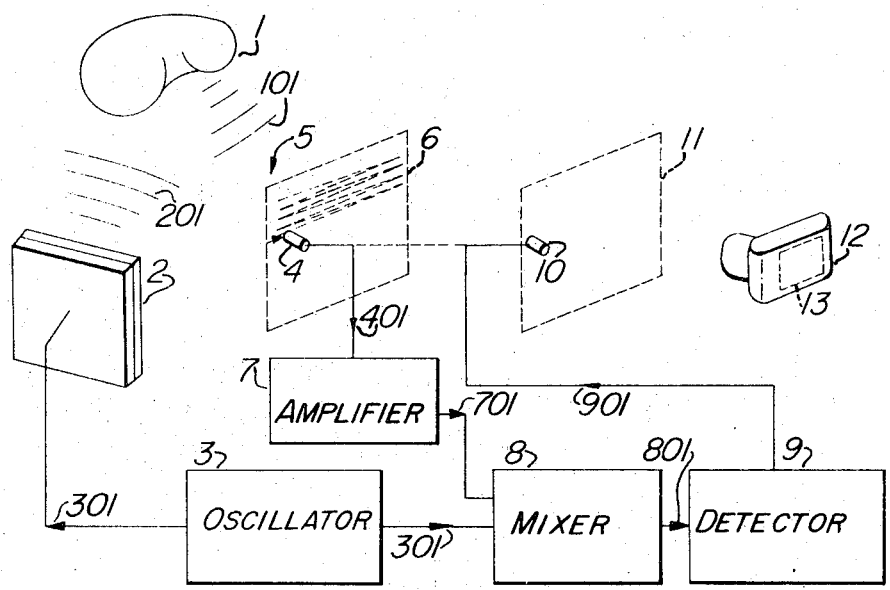
FIG. 1 is a schematic diagram illustrating an example of the hologram recording system including a block diagram of the electric circuit.

Referring to FIG. 1 which shows a typical system for recording an ultrasonic hologram, reference numeral 1 designates an object or specimen to be analyzed or inspected, 2 an ultrasonic transducer, 3 an oscillator for generating a high frequency signal 301 with which said transducer 2 is excited, and 4 a detector for detecting ultrasonic wave 101 reflected by the object 1 which is exposed to the ultrasonic wave 201 emitted from the transducer 2. The detector 4 is moved to scan an area 6 in a plane taken within the ultrasonic wave conducting medium 5 and gives out a succession of signals 401 which bear information about the distribution of the intensity of the ultrasonic wave in the area 6. The signal 401 is amplified by an amplifier 7 up to a required level, and output signal 701 from the amplifier 7 is mixed in a mixer 8 with a high frequency signal 301 fed from the oscillator 3. The mixing of the signal 301 with the signal 701 gives a result corresponding to what would have been obtained if a reference ultrasonic beam were projected on to the ultrasonic image in the area 6 in the direction perpendicular thereto. Output 801 of the mixer 8 is detected in a signal detector 9, and output 901 from the latter is given to a lamp 10. Therefore, the lamp 10 emits light having an intensity corresponding to that of ultrasonic wave detected by the detector 4 and modulated by the reference wave. As the lamp 10 is moved in the corresponding positional relation to the detector 4 to thereby scan an area 11, an optical hologram of the ultrasonic pattern in the area 6 is traced in the area 11. This image is taken by a camera 12 to make a recorded hologram 13.

The thus obtained hologram is reproduced by the system of this invention, an embodiment of which is hereunder described in detail.

Figure 2:
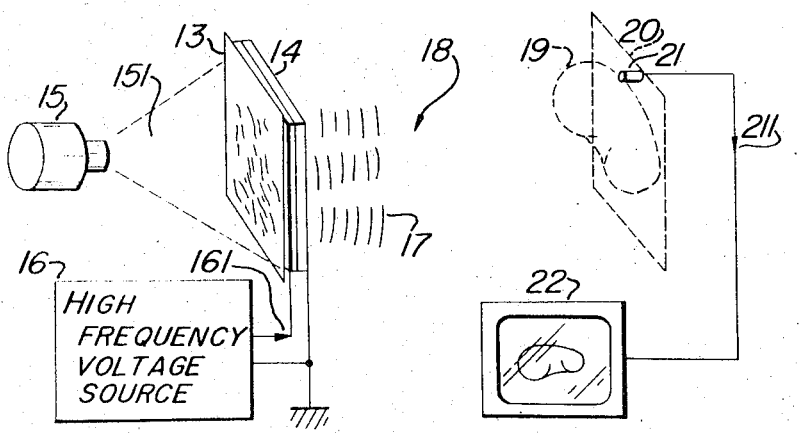
FIG. 2 is a schematic diagram showing general structure of an embodiment of the reproduction system of this invention.
Figure 3:
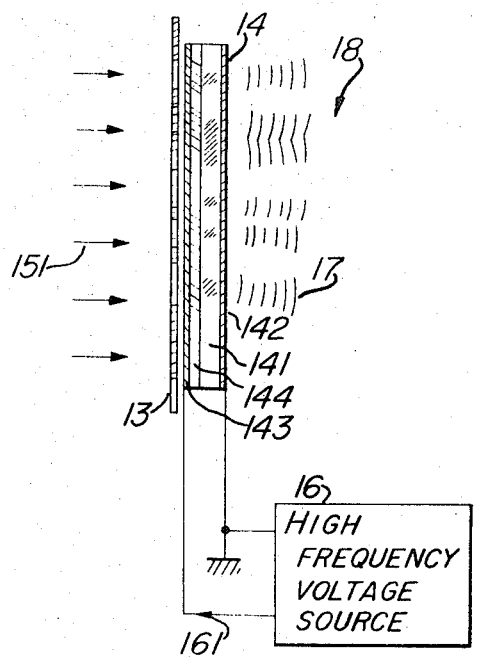
FIG. 3 is a schematic diagram of an ultrasonic transducer used in the system shown in FIG. 2.

Referring to FIG. 2, a hologram 13 prepared by the method as described above is placed on one surface of a light-controlled ultrasonic transducer 14 whose structure is depicted in FIG. 3. Referring to FIG. 3, the transducer 14 consists of a piezoelectric plate 141, a film of a first electrode 142 attached to one face of the piezoelectric plate 141, a layer of photoconductive material 144 attached to the other face of the piezoelectric plate and a second transparent electrode 143 provided further on the photoconductive layer 144. A high frequency voltage source 16 is provided to apply a high frequency voltage 161 between the electrodes 142 and 143. If a flux of light 151 is projected to the hologram 13 placed on the transducer 14, the photoconductive layer 144 is irradiated with light having he pattern of the hologram 13 through the transparent electrode 143, and the layer 144 is rendered to present conductivity in the corresponding pattern. Accordingly, the high frequency voltage 161 from the source 16 is modulated spot by spot so as to impose voltages on the piezoelectric plate 141 in the same pattern. Thus, the piezoelectric plate 141 emits an ultrasonic wave 17 having a corresponding pattern of intensity distribution into a medium 18.

Returning to FIG. 2, reference numeral 15 designates a light source for projecting light on to the transducer 14 according to the pattern of density of the hologram 13. The transducer 14 emits an ultrasonic wave 17 having an intensity distribution reflecting the pattern of the hologram 13, as described above the with reference to FIG. 3. In this respect, the high frequency voltage 161 serves as the reference signal in the same manner as a coherent reference light is projected on to a hologram in the optical reproduction of the hologram. The ultrasonic wave 17 emitted into a medium 18 produces an acoustic holographic image 19 of the object 1 in the medium 18. A plane 20 across the image 19 is scanned with a detector 21 which is sensitive to the ultrasonic wave 17. Output signal 211 from the detector 21 is applied to an image display device 22 such as a cathode ray tube or a facsimile receiver in which the viewing screen is scanned in synchronization with the movement of the detector 21. Thus, a sectional view of the holographic image 19 taken at the plane 20 is visualized on the screen of the display device 22.

Visualization of the holographic image 19 can be effected also by other measures than the use of such a display device as described above. For example, minute flakes of aluminum are added to the liquid medium 18. Upon being disturbed by the ultrasonic wave, the suspended aluminum flakes tend to like up more clearly at places where the amplitude of the wave is larger. Thus, the holographic image can be directly visualized.

In order to minimize astigmatism in the reproduction, the wavelength $\lambda_2$ of the ultrasonic wave 17 emitted from the transducer 14 into the medium 18 is preferably chosen to be in the following relation to the wavelength $\lambda_1$ of the ultrasonic wave 201 used in the recording of the hologram:

$$\lambda_2/\lambda_1 = S_2/S_1$$

where $S_1$ is a quantity representing the dimensions of the area 6, and $S_2$ is the same of the area of the projected hologram on the transducer 14. Namely, $S_2/S_1$ represents the reduction ratio of the hologram used in the reproduction to the area 6 scanned in the recording process.

It should be noted that the holographic image 19 is a three-dimensional image as the wave 101 contains not only an echo from the surface of the object 1 but also echoes from within the object. Therefore, by choosing the position of the plane 20 which is scanned by the detector 21 in the reproduction, the image of a desired section of the object 1 can be shown on the display device 22 in an ultrasonic interpretation of the structure of the object 1.

In the above-described embodiment, a photographic film has been used for recording the hologram from which the holographic image 19 is reproduced by means of the light-controlled transducer 14. In the following embodiments of this invention, the reproduction is achieved not using a photographic film.

Figure 4:
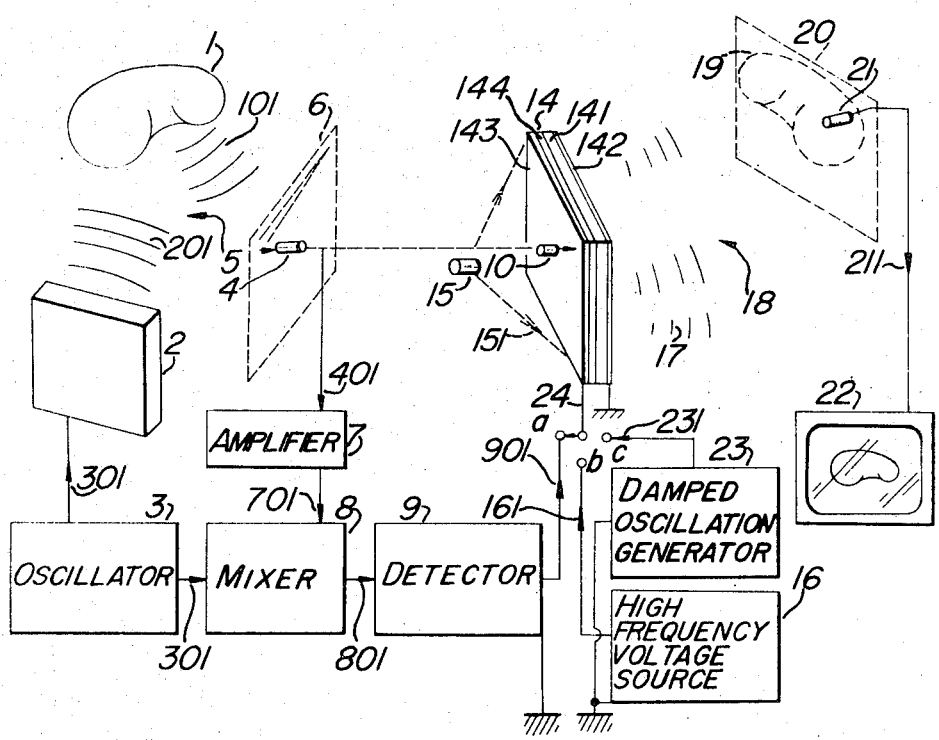
FIG. 4 is a schematic diagram showing another embodiment of the reproduction system of this invention.
Figures 5A, 5B:
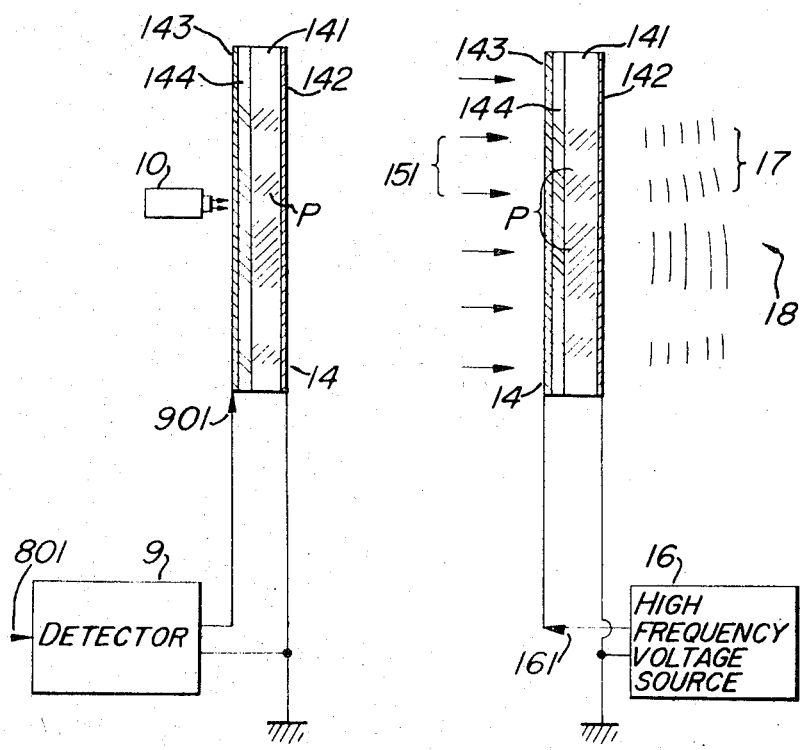
FIGS. 5a, 5b, 6a and 6b are schematic diagrams useful for explaining the operations of further examples of ultrasonic transducers used in the system of this invention.

Referring to FIG. 4 which shows another embodiment of the reproduction system of this invention also with the hologram making system, components similar to those shown in FIGS. 1 to 3 are indicated by corresponding reference numerals. Especially, the light-controlled transducer and its components shown in FIGS. 4, 5a and 5b are indicated with the same numerals as shown in FIGS. 1 to 3, as both transducers are identical in the general structure though they are actually more or less different from each other in physical particulars. In FIG. 4, a damped oscillation source 23 generates a damped oscillation signal 231. The voltage to be applied to the transducer 14 is selected by means of a switch 24 from among the damped oscillation signal 231, output signal 901 of the signal detector 9 and the high frequency signal 161 from the source 16. Namely, either one of the signals 901, 161 or 231 is led to the transparent electrode 143 of the transducer 14 in correspondence to position $a$, $b$ or $c$ of the switch 24.

With the switch 24 at position $a$ firstly, the lamp 10 is moved to scan the surface of the photoconductive layer 144 of the transducer 14 is synchronization with the previously-mentioned scanning of the area 6 with the detector 4. A constant light beam emitted from the lamp 10 and projected on the photoconductive layer 144 through the transparent electrode 143 makes the layer 144 electrically conductive at the spot where the light beam hits the layer 144. As the output signal 901 from the signal detector 9 is applied between electrodes 142 and 143, a polarization (indicated by character $p$ in FIG. 5a) proportional to the magnitude of the signal 901 is produced in the piezoelectric plate 141 at the said irradiated spot. Therefore, as the area 6 is scanned with the detector 4, polarization of a corresponding pattern of intensity is produced in the piezoelectric plate 141. Thus, an ultrasonic hologram is stored in the plate 141.

For the reproduction of the holographic image from the hologram stored in the plate 141, the switch 24 is turned to position $b$, to thereby apply the high frequency voltage 161 from the source 16 between electrodes 142 and 143 of the transducer 14. Further, the photoconductive layer 144 of the transducer is irradiated with uniform light 151 from an auxiliary light source 15, so that the whole of the photoconductive layer is rendered conductive. Accordingly, the high frequency voltage 161 from the source 16 is applied to the piezoelectric plate 141 to make it oscillate in the same high frequency. Thus, the piezoelectric plate 141 emits an ultrasonic wave 17 into the medium 18 in a pattern of distributed intensities corresponding to the distribution of the polarization in the plate 141. The emitted ultrasonic wave 17 produces an acoustic holographic image 19 of the object 1 in the medium 18.

The acoustic holographic image is visualized by the same measures as described hereinbefore in connection with the first embodiment of the invention. Here again, the direct observation of the acoustic holographic image is made possible by the aid of fine flakes of aluminum suspended in the medium. Further, by properly choosing the position of the plane 20 which is to be scanned by the detector 21, the image of desired section of the object 1 can be shown on the display device 22.

In order to erase the polarization in the piezoelectric plate 141 after completion of the reproduction, the switch 24 is turned to position c to thereby cut the high frequency voltage 161 from the transducer 14 and instead to lead a damped oscillation signal 231 from the source 23 thereof to the transducer 14. Thus, the polarization in the plate 14 is erased in the well known manner, and the transducer becomes ready for the next reproduction cycle.

In the above-described embodiment, the information carried by the signal 901 is stored in the piezoelectric plate 141 by the medium of photoelectric means such as the photoconductive layer 144 and the lamp 10. As an alternative measure, a system in which no such photoelectric means are used is possible. Such an embodiment will be described hereunder.

Figure 6A:
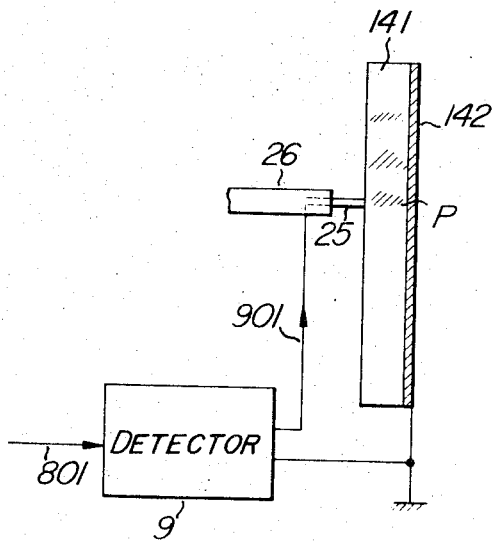

Referring to FIG. 6a, a piezoelectric plate 141 is provided with a planar electrode 142 on one surface thereof. A stylus electrode 25 attached to a support 26 is moved in synchronization with the detector 4 shown in FIG. 4. For storing holographic information in the piezoelectric plate 141, the image signal 901 from the signal detector 9 is imposed on the plate 141 by means of the stylus electrode 25 to cause spot-by-spot polarization in the piezoelectric plate in proportion to the intensity of the image signal 901. Thus, a latent pattern of polarization corresponding to the pattern of hologram is produced in the piezoelectric plate 141.

Figure 6B:
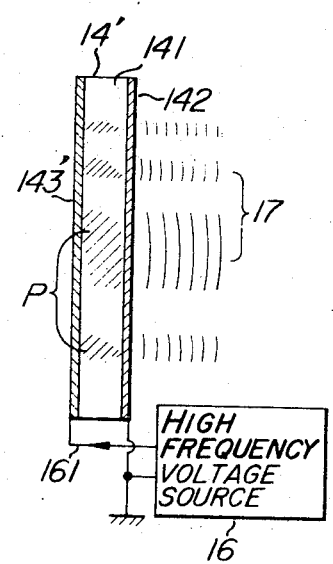

For the reproduction of a holographic image from the latent information stored in the plate 141, firstly a complemental electrode 143', which may not be transparent, is attached to the piezoelectric plate 141 as shown in FIG. 6b, and then the high frequency voltage 161 from the source 16 is applied between the electrodes 143' and 142 to excits the piezoelectric plate 141. Ultrasonic wave 17 thus emitted from the plate 141 produces an acoustic image 19 in the medium 18 in the same manner as described above in connection with FIG. 5b. The measure of this embodiment is advantageous if the latent pattern of polarization should not be erased but preserved, as the transducer is very simple in structure.

As described above, according to the arrangements shown in FIGS. 4, 5a, 5b, 6a and 6b, a hologram is obtained as a pattern of polarization in a piezoelectric plate, rendering unnecessary the troublesome process involved in dealing with photographic films.

What is claimed is:

1. A holographic imaging system by ultrasound, wherein reproduction means comprises a planar transducer for emitting an ultrasonic wave in response to an electric excitation, said transducer being able to be electrically strained spot-by-spot over the plane thereof so as to store a pattern of electrical strains and the intensity of the ultrasonic wave emitted from a given spot in the plane of said transducer being a representation of said electrical excitation modulated by the magnitude of the strain at the spot, means for exciting said transducer to emit an ultrasonic wave into an ultrasonic wave conducting medium to produce a pattern of acoustic stress in said medium, and means for visualizing said acoustic stress.

2. A system according to claim 1, wherein said planar transducer comprises a piezoelectric plate, a layer of photoconductive material attached to one surface of said piezoelectric plate, a first planar electrode provided on the other surface of said piezoelectric plate, and a second transparent planar electrode provided on the outer surface of said photoconductive layer; and said means for exciting said transducer comprises a high frequency voltage source output of which is applied across said transducer by means of said electrodes and a light source for irradiating said transducer on the side of said photoconductive layer.

3. A system according to claim 1, wherein said planar transducer comprises a piezoelectric plate and a planar electrode provided on one surface of said piezoelectric plate; and said means for exciting said transducer comprises another planar electrode which is attachable to the other surface of said piezoelectric plate and a high frequency voltage source output of which is applied across said transducer by means of said both electrodes.

4. A system according to claim 1, wherein said means for visualizing the acoustic stress comprises a pressure-sensitive detector which is moved so as to scan a plane across said pattern of acoustic stress and produce a succession of electric signal, and a display means for producing a visual image from said succession of electric signal.

5. A system according to claim 1, wherein said means for visualizing the acoustic stress comprises a body of liquid containing minute flakes of aluminum suspended therein.

6. A system according to claim 1, said system comprising means for imparting such an electrical strain to said transducer in a pattern of an ultrasonic hologram, means for exciting said transducer to emit an ultrasonic wave into an ultrasonic wave conducting medium to produce a pattern of acoustic stress corresponding to the holographic image of said hologram in said medium, and means for visualizing said acoustic stress.

7. A system according to claim 6, wherein said means for imparting an electrical strain to the transducer comprises the means for projecting an optical image of an ultrasonic hologram on to the plane of said transducer.

8. A system according to claim 6, wherein said means for imparting an electrical strain to the transducer comprises means for scanning a plane of said transducer with a light spot which is moved in synchronization with the movement of a pressure-electric transducer while an electric signal modulated by the output signal of said pressure-electric transducer is applied to said transducer.

9. A system according to claim 6, wherein said means for imparting an electrical strain to the transducer comprises means for scanning a plane of said transducer with a stylus which is moved in synchronization with the movement of a pressure-electric transducer while an electric signal modulated by the output signal of said pressure-electric transducer is applied to said transducer by means of said stylus.

* * * * *